United States Patent [19]

Looman

[11] Patent Number: 5,070,666
[45] Date of Patent: Dec. 10, 1991

[54] TOP CAP INSERT FOR A WALL PANEL IN A SPACE DIVIDER SYSTEM

[75] Inventor: James A. Looman, Holland, Mich.

[73] Assignee: Herman Miller, Inc., Zeeland, Mich.

[21] Appl. No.: 584,479

[22] Filed: Sep. 18, 1990

[51] Int. Cl.⁵ ............................................. A47G 5/00
[52] U.S. Cl. ........................................ 52/239; 52/36; 52/160; 52/351; 52/135; 52/24
[58] Field of Search ............... 160/135, 351; 211/182, 211/189; 24/453, 615, 625; 52/239, 36

[56] References Cited

U.S. PATENT DOCUMENTS

| 30,777 | 10/1981 | Ytter | 160/135 |
|---|---|---|---|
| 3,024,878 | 3/1962 | Huggins . | |
| 3,118,017 | 1/1964 | Wimbish . | |
| 3,471,629 | 10/1969 | O'Leary . | |
| 4,055,930 | 11/1977 | Weinar et al. . | |
| 4,104,838 | 8/1978 | Hage et al. . | |
| 4,118,903 | 10/1978 | Coulthard . | |
| 4,267,677 | 5/1981 | Randolph et al. . | |
| 4,448,003 | 5/1984 | Hasbrouck . | |
| 4,602,124 | 7/1986 | Santucci . | |
| 4,621,471 | 11/1986 | Kuhr et al. . | |
| 4,642,957 | 2/1987 | Edwards . | |
| 4,696,136 | 9/1987 | Grewe . | |
| 4,713,918 | 12/1987 | Cioffi . | |
| 4,887,401 | 12/1989 | Gioscia . | |
| 4,891,922 | 1/1990 | Hozer et al. . | |
| 4,908,917 | 3/1990 | Kazle | 24/615 |
| 4,962,805 | 10/1990 | Allen | 52/239 X |

Primary Examiner—Richard E. Chilcot, Jr.
Assistant Examiner—Wynn Wood
Attorney, Agent, or Firm—Varnum, Riddering, Schmidt & Howlett

[57] ABSTRACT

An end insert for a top cap on a wall panel comprises a extension member removably joined to a tail member. The tail member is received within a channel of the top cap and affixed to the top cap by sonic welding. The extension member is an elastomer and has a stop flange which covers the open end, and a portion which extends away from the open end.

24 Claims, 3 Drawing Sheets

TOP CAP INSERT FOR A WALL PANEL IN A SPACE DIVIDER SYSTEM

BACKGROUND OF THE INVENTION

1. Field of the Invention

The present invention relates generally to wall partitions in a space divider system, and more particularly, to a top cap on the wall partition.

2. Scope of the Prior Art

Space divider systems comprising wall partitions or panels arranged end to end on the floor and supported by depending leg supports provide the user with great flexibility in arranging and rearranging work areas to meet changing activities. Installing an energy supply and communications system within the wall panels has proven to be a convenient and efficient method of providing individual work areas with electricity and communications service. Providing such electrical wiring systems within a channel in a top edge of wall panels is known. Typically, a top cap serving as a cover member is used to enclose the channel at the top edge of the panel, and also serves to provide an aesthetic trim finish to the wall panel top edge.

A top cap usually is associated with a single panel or partition, and has a length essentially equal to the length of the panel. Top caps are frequently extruded U-shaped pieces, and thus have exposed openings at the respective ends of the top cap. Separate caps are usually provided at the panel joints and an end cap is provided at the end of a panel run.

SUMMARY OF THE INVENTION

In accordance with the invention, a space divider system comprises at least two portable upright panels horizontally serially aligned so that vertical ends of the panels are positioned in close proximity to one another. Each of the panels has a top cap having a channel with an open end, and the open end in the top cap of one of the panels is disposed opposite the open end on the top cap of the other panel. A pair of end inserts is provided wherein one of the pair is received within the channel of one top cap, and the other of the pair is received within the channel of the other top cap. Each end insert has a resilient distal portion extending from the open end of a respective to cap so that the distal ends are positioned in close proximity to one another. The end inserts provide visual continuity at the interface between panels.

Preferably, one of the inserts comprises a tail member mechanically joined to an extension member. The extension member carries the distal portion and the tail member is received within the channel.

In another aspect of the invention, an end insert is provided for a top cap on a wall panel. The wall panel typically has a top edge, and the top cap covers a portion of the top edge. The cap typically has a channel with an open end, and the end insert comprises an extension member removably joined to a tail member. The tail member is received within the channel of the cap, and affixed to the top cap. The extension member has a distal portion extending away from the open end.

In another aspect of the invention, the end insert comprises a first member having an extended flange, a second member adapted to be received within the channel and fixedly mounted to the top cap, and means for removably connecting the first member to the second member so that the flange extends away from the open end when the second member is received is received from the channel.

Preferably, the first member is an elastomer, and has a stop flange which abuts the open end when the first member is connected to the second member.

In connecting the two members, the first member has a coupling flange having an aperture therethrough, and the second member has a ledge which has a stub of a diameter so that the stub can be press fit into the aperture. Another aspect of the connection is characterized by a groove on one side of the coupling flange, and a rib on a surface of the ledge so that the groove is adapted to receive the rib. Preferably, the second member is formed of a rigid plastic and has a tab extending therefrom with the tab secured to the top cap by ultrasonic welding or chemical bonding.

In another aspect of the invention, the extension member and the tail member can be joined together and utilized as a connector between two adjoining top caps wherein the tail can be affixed to the first cap, and the extension member will have a distal portion extending away from the end of the first cap and slidably received within a second channel of the second cap so that the stop flange is interposed between the two adjoining open ends. In this configuration, the first and second caps and the stop flange present a visually continuous line.

BRIEF DESCRIPTION OF THE DRAWINGS

The invention will now be described in accordance with the following drawings in which.

DESCRIPTION OF THE PREFERRED EMBODIMENT

Figure 1:
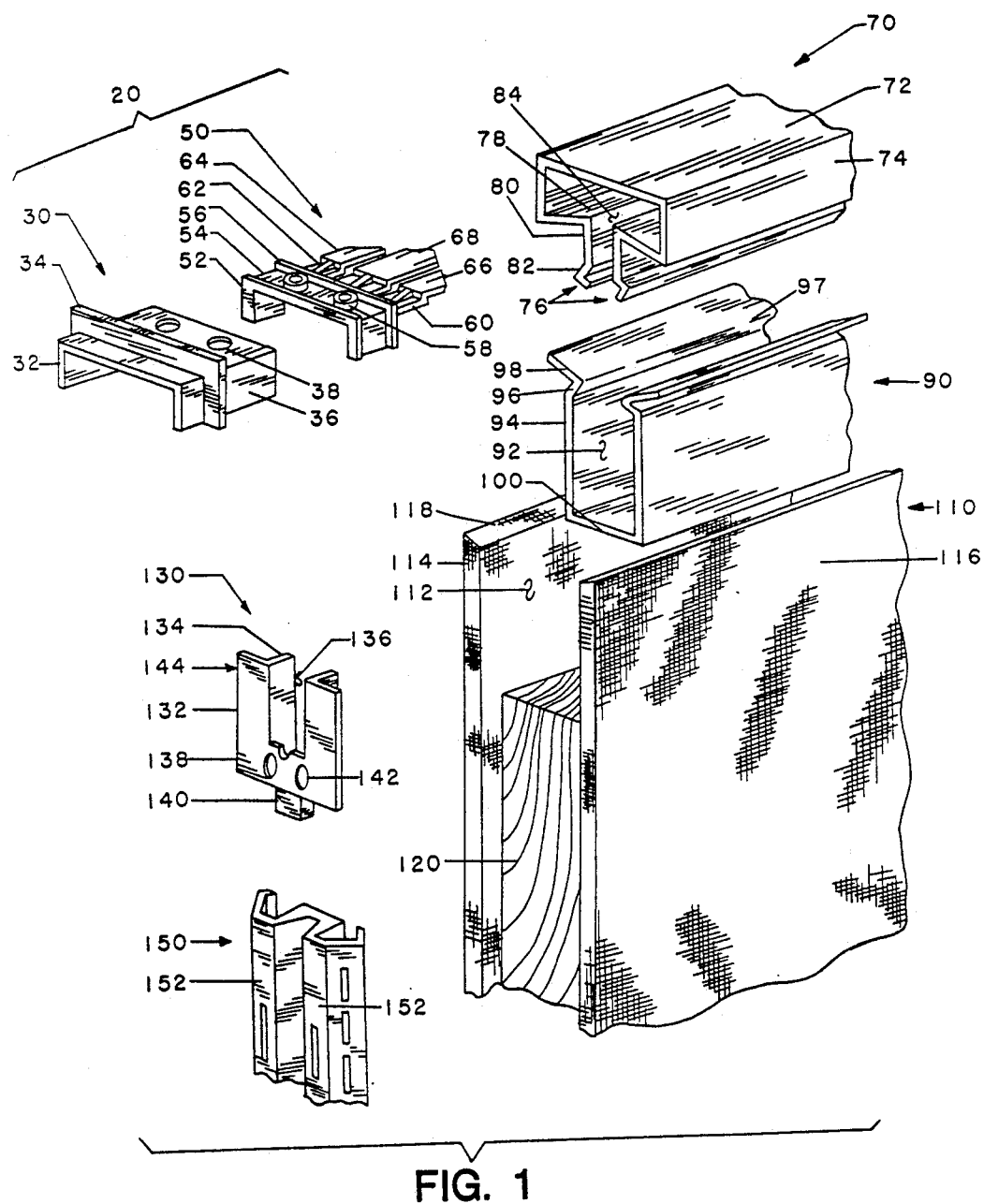
FIG. 1 is an exploded view of a portion of a wall panel with a top cap, with an end insert according to the present invention.

Referring now to the preferred embodiment illustrated in the drawings, and specifically to FIG. 1, an end insert 20 for a top cap 70 comprises a separable two-piece body formed of a extension member 30 which is adapted to be joined to a tail member 50. The tail member 50, in turn, is adapted to be received by the top cap 70 in a manner to be described hereinafter.

The top cap 70 has two opposed spring flanges 76 joined together by a web 72. It will be understood that the web 72 may be of any shape consistent with the aesthetic lines of the wall panel 110 to which it is attached. In the illustrated embodiment, the web 72 is boxlike, having a flat top 73, and two opposed sides 74. Other shapes, for example, might include a U-shaped web 72 without defined sides 74. In any event, the web 72 and the spring flanges 76 define a channel 84. Preferably, the top cap 70 is formed of extruded plastic.

Each spring flange 76 comprises an inwardly directed flange 78 which extends inwardly from the web 72 to partially define the channel 84, and a downwardly extending flange 80, which extends downwardly roughly at an acute angle relative to the inwardly directed flange 78. A longitudinal rib 82 is disposed on the downwardly extending flange 80. The downwardly extending flanges 80 are adapted to be received in a snap fit engagement by a channel liner 90 which is disposed within a wire management channel 112 defined by opposed faces 116 of the wall panel 110.

The channel liner 90 is generally U-shaped, having side walls 94 and a bottom wall 100 which define a channel 92. The side walls 94 are joined to an inwardly directed portion 96 terminating in a locking edge 97, which in turn is connected to an outwardly directed stop flange 98. It will be seen that the channel liner 90 is readily received within the wire management channel 112 of the wall panel 110 so that the stop flanges 98 come to rest on upper edges 118 of the panel surfaces 116. The channel liner 90 is secured to the wall panel 110 by suitable fastening means. As with the top cap 70, the channel liner 90 may be formed of plastic, particularly in view of a need to provide additional electrical insulation to the wire management channel 112.

Figure 4:
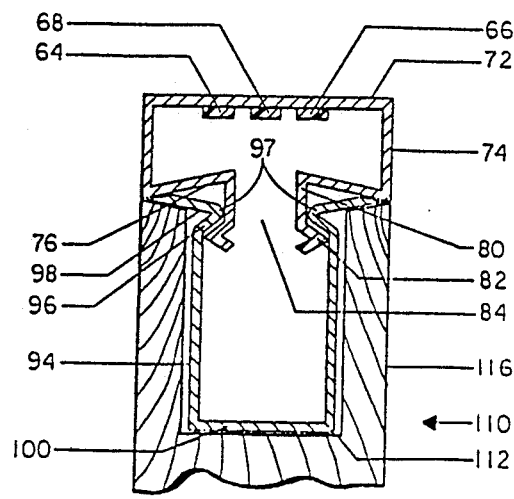
FIG. 4 is a sectional view taken along line 4—4 of FIG. 2.

The top cap 70 is thus adapted to cooperate with the channel liner 90 by being snap fitted in a downward direction to become securely locked with respect to the channel liner 90 as shown in FIG. 4. This assembly is achieved merely by moving the top cap 70 from the position shown in FIG. 1 downwardly until the ribs 82 engage the locking edges 97 of the channel liner 90, at which time continued downward pressure upon the top cap 90 will cause an inwardly directed deflection of the flanges 80 until the ribs 82 are beneath the locking edges 97 whereupon they will spring outwardly toward the side walls 94 of the channel liner 90 in a snap fit engagement.

The wall panel 110 typically also includes a side edge 114, which has a hardware channel 120 partially defined by the panel sides 116. A hanger frame 150 having face portions 152 and slots 154 is securely fitted within the hardware channel 120.

Figure 2:
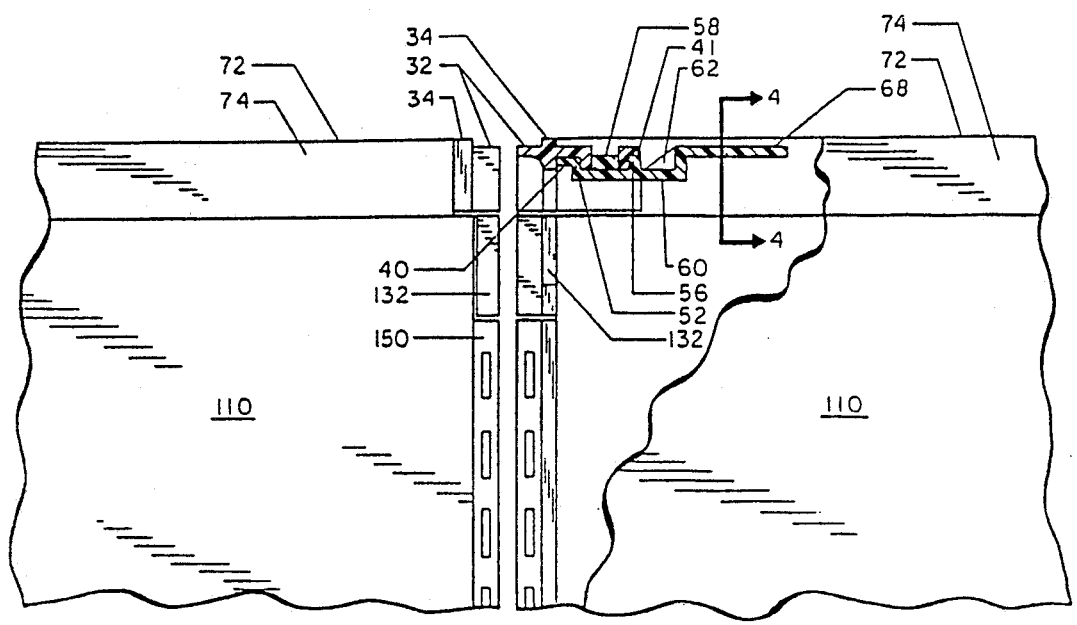
FIG. 2 is an elevational view of two adjoining panels incorporating top caps and end inserts of the type illustrated in FIG. 1, partially in cross section, and partially broken away to show detail.

As can be seen in FIGS. 1 and 2, a wedge block 130 is disposed at the conjunction of the hardware channel 120 and the wire management channel 112. The wedge block 130 is generally U-shaped having stop flanges 132 and alignment flanges 134. The alignment flanges 134 generally define a U-shaped channel 136 which corresponds in shape with the channel 92 defined by the channel liner 90. A base 138 of the wedge block 130 includes a spacer block 140 and a pair of apertures 142. The wedge block is typically mounted adjacent the hanger frame 150, at least partially within the hardware channel 120 so that the alignment flanges 134 will abut the edges of the channel liner 90.

The block 130 may be secured by screws disposed through the apertures 142 or by any other suitable means not pertinent to this invention. Generally, the face of the stop flange 132 lies in a plane with the face 152 of the hanger frame 150, maintained in such position by the spacer block 140. It will thus be seen that the top cap 70 provides a visually continuous horizontal edge at the top of the panel, and the hanger frame 150 and wedge block 130 provides a visually continuous vertical line at the side edge of the panel. The end insert 20 according to the invention provides a suitable finish to the corner, particularly carrying forward the vertical line of the side edge.

Referring again to FIG. 1, the extension member 30 of the end insert 20 is preferably formed of a resilient elastomer. An example of a suitable elastomer is an olefin based thermoplastic rubber having a low durometer in the range of 55-70. A suitable thermoplastic rubber is sold by Shell Oil Company as KRATON, Shell #7705. The extension member 30 includes a distal portion 32 extending outwardly from a stop flange 34. A coupling flange 36 extends from the stop flange 34 in a direction opposite that of the distal portion 32. The distal portion 32 and the coupling flange 34 are generally U-shaped, each with an outside surface that conforms generally to the shape of the top cap channel 84. A pair of coupling apertures 38 are located in the coupling flange 36, and a groove or channel 40 is located on the underside of the coupling flange 36 between the coupling apertures 38 and the stop flange 34 (see FIG. 2). A shoulder 41 is disposed near the peripheral edge of the coupling flange 36.

The tail member 50 is preferably formed of a hard plastic material and includes a U-shaped ledge 54, complementary in shape to the coupling flange 36 of the extension member 30. The peripheral edges of the ledge 54 include upwardly extending ribs 52, 56. A suitable plastic material is a high-impact ABS sold by General Electric Company under the name of CYCOLAC AR resin. A pair of studs 58 extend upwardly from the base 54 intermediate the ribs 52, 56. Each stud is dimensioned so that it can be press fit into a corresponding coupling aperture 38. Several spacing flanges 60 extend axially from the ledge 54 away from the rib 56. Each flange 60 is strengthened by a gusset 62. Extending further axially from the spacing flanges 60 are connecting tabs 64, 66, and 68.

Figure 3:
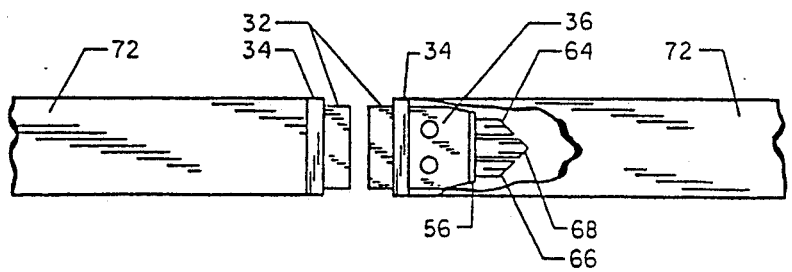
FIG. 3 is a plan view of the wall panels of FIG. 2, with portions partially broken away to show detial.

Referring now to FIGS. 2-4, it will be seen that the extension member 30 is adapted to be coupled to the tail member 50 by a snap fit engagement wherein the studs 58 are received by press fit into the coupling apertures 38, and the ribs 52, 56 are received by the groove 40, and shoulder 41, respectively. Thus, the end insert 20 will have rigid plastic tabs 64, 66, 68 extending from a resilient distal portion 32 and the stop flange 34. The assembled end insert 20 is then affixed to the open end of the top cap 70 by inserting the tail member 50 and the associated coupling flange 36 into the channel 84 of the top cap 70 until the stop flange 34 contacts the edge of the top cap 70. The connecting tabs 64, 66, and 68 are disposed to engage the inside surface of the top cap 72 where they may be ultrasonically welded thereto (see FIG. 4).

Referring now to FIG. 2, when two panels 110 are disposed adjacent to each other, it will be seen that the top caps 70 on each panel can have end inserts 20 which will likewise be disposed adjacent to each other. The resiliency provided by the elastomeric extension member provides for flexibility in the connection between the adjoining panels and top caps. Thus, for example, if the lengths of the respective top caps 70 were slightly too long for the respective panels, the adjacent end inserts 20 would be in contact, and the extension members 30 may be slightly compressed. Conversely, if the top caps 70 were slightly too short, there may be a slight gap between the extension members 30, but the shape of the end inserts 20 would nevertheless carry the visual lines of the top caps 70 and hanger frames 150 and thus maintain the aesthetic appearance of the panels.

Figure 5:
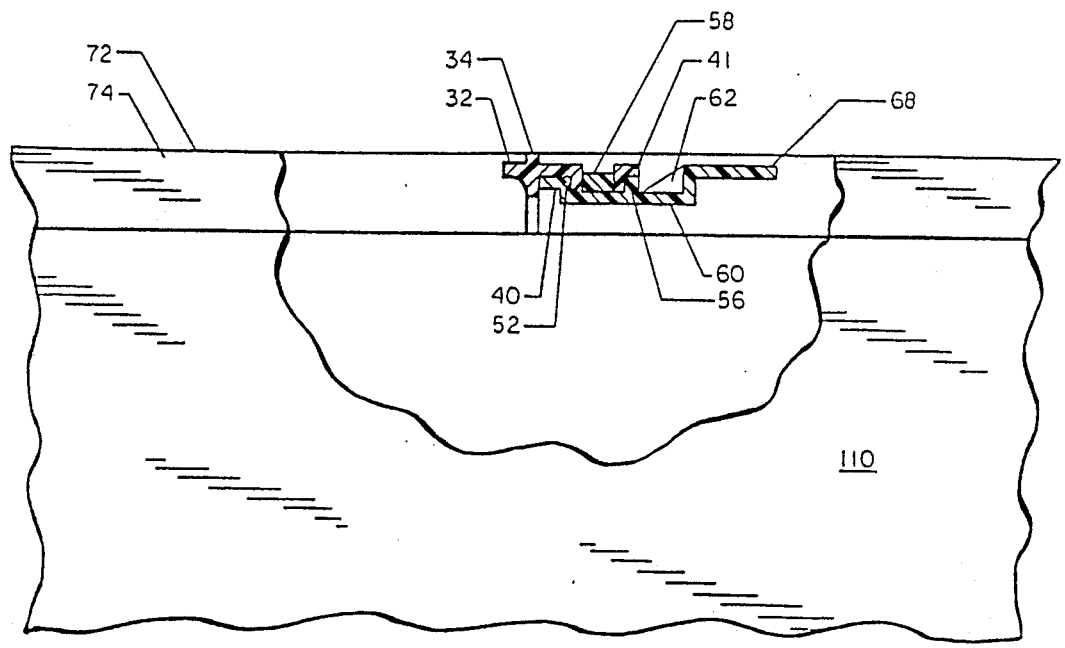
FIG. 5 is an elevational view similar to FIG. 2 showing another embodiment of a wall panel incorporating the invention.

It will also be understood that the complementary shape of the distal portion 32 enables it to be received directly into an adjoining top cap up to the stop flange 34 as shown in FIG. 5. The stop flange 34 will preferably have an edge which is complementary in shape to the outside surface of the top cap 70 so that the two adjoining top caps may be joined together by a single end insert and the visual continuity of the exterior surface of the top cap can be maintained. Thus, two short lengths of top cap may readily be connected on a single longer panel 110.

Reasonable variation and modifications are possible within the scope of the foregoing disclosure and drawings without departing from the spirit of the invention which is defined by the appended claims.

The embodiments of the invention in which an exclusive property or privilege is claimed are defined as follows:

1. In a space divider system comprising at least two portable upright panels horizontally serially connected so that vertical ends of the panels are positioned in close proximity to one another, each of said panels having a top cap covering a portion of the top edge thereof, and each top cap having a channel with an open end, said open end on the top cap on one panel being disposed opposite the open end on the top cap on the adjoining panel, the improvement comprising:
a pair of end inserts, one of said pair received within the channel of one top cap, and the other of said pair received within the channel of the other top cap, each end insert having a resilient distal portion extending from the open end of its respective top cap so that the distal ends are positioned in close proximity to one another to provide visual continuity along the interface between the two panels.

2. A space divider system according to claim 1 wherein one of said end inserts comprises a tail member mechanically joined to an extension member, said extension member carrying the distal portion, and the tail member being received within the channel and affixed to the top cap.

3. A space divider system according to claim 2 wherein the extension member has a stop flange which abuts the open end of the top cap, said stop flange having an edge which corresponds in shape to the contour of the outer surface of the top cap.

4. A space divider system according to claim 3 wherein the tail member is formed of rigid plastic and has a tab which is ultrasonically welded to the top cap.

5. A space divider system according to claim 4 wherein the extension member has a coupling flange with an aperture therethrough, and the tail member has a ledge with a stub of a diameter so that the stub can be press fit into the aperture when the coupling flange rests upon the ledge.

6. A space divider system according to claim 5 wherein the extension member has a coupling flange with a groove on one side thereof, and the tail member has a ledge with a rib a surface thereof so that the groove will receive the rib when the coupling flange rests upon the ledge.

7. A space divider system according to claim 2 wherein the tail member is formed of rigid plastic and has a tab which is ultrasonically welded to the top cap.

8. A space divider system according to claim 2 wherein the extension member has a coupling flange with an aperture therethrough, and the tail member has a ledge with a stub of a diameter so that the stub can be press fit into the aperture when the coupling flange rests upon the ledge.

9. A space divider system according to claim 2 wherein the extension member has a coupling flange with a groove on one side thereof, and the tail member has a ledge with a rib a surface thereof so that the groove will receive the rib when the coupling flange rests upon the ledge.

10. In a portable wall panel having a top edge, a cap covering a portion of the top edge, said cap having a channel with an open end, the improvement comprising:
an extension member removably joined to a tail member, said tail member being received within the channel and affixed to the top cap, and said extension member having a distal portion extending away from the open end.

11. A portable wall panel according to claim 10 wherein the distal portion is formed of a resilient material.

12. A portable wall panel according to claim 10 wherein the extension member has a stop flange which covers the open end and has an edge which corresponds in shape to the contour of the outer surface of the cap.

13. A portable wall panel according to claim 10 wherein the tail member is rigid plastic and has a ledge and a tab extending from the ledge, said tab being ultrasonically welded to an inside surface of the cap.

14. A portable wall panel according to claim 13 wherein the extension member has a coupling flange with an aperture therethrough, and the ledge has a stub of a diameter so that the stub can be press fit into the aperture.

15. A portable wall panel according to claim 10 wherein the extension member has a coupling flange with an aperture therethrough, and the tail member has a ledge with a stub of a diameter so that the stub can be press fit into the aperture.

16. A portable wall panel according to claim 10 wherein the extension member has a coupling flange with a groove on one side thereof, and the tail member has a ledge with a rib on a surface thereof, and the groove is adapted to receive the rib.

17. An end insert for a top cap on a wall panel, said top cap having a channel with an open end, said insert comprising:
a first member having an distal portion;
a second member adapted to be received within the channel and fixedly mounted to the top cap; and
means for removably connecting the first member to the second member so that the distal portion extends away from the open end when the second member is received in the channel.

18. An end insert according to claim 17 wherein the first member is an elastomer.

19. An end insert according to claim 17 wherein the first member has a stop flange which abuts the open end when the first member is connected to the second member.

20. An end insert according to claim 17 wherein the connecting means comprises a coupling flange on the first member, said coupling flange having an aperture therethrough, and a ledge on the second member, said ledge having a stub of a diameter so that the stub can be press fit into the aperture.

21. An end insert according to claim 20 wherein the coupling flange has a groove on one side thereof, and the ledge has a rib on a surface thereof, said groove being adapted to receive the rib.

22. An end insert according to claim 17 wherein the second member is formed of a rigid plastic.

23. An end insert according to claim 17 wherein the second member has a tab extending therefrom, and said tab is secured to the top cap by ultrasonic welding.

24. In a portable wall panel having a top edge, a first cap covering a portion of the top edge and a second cap covering another portion of the top edge, each of said caps having a channel with an open end, the first and second caps being disposed axially of one another so that first and second open ends oppose each other, and a connector for connecting the first cap to the second cap, the improvement in said connector comprising:

a resilient extension member removably joined to a rigid tail member, said tail member being received within the first cap channel and affixed to the first cap, said extension member having a stop flange which abuts the first open end and has an edge which corresponds in shape to the contour of the outer surface of the caps, said extension member further having a distal portion extending away from the first open end and slidably received within the second channel so that the stop flange also abuts the second open end whereby the first and second caps and the stop flange present a visually continuous line.

* * * * *